United States Patent
Tsai et al.

(10) Patent No.: US 8,793,532 B1
(45) Date of Patent: Jul. 29, 2014

(54) HARD-DISK DRIVE WORK LOAD PROFILING AND CAPTURING SYSTEMS AND METHODS

(75) Inventors: Chun Sei Tsai, Tustin, CA (US); William B. Boyle, Lake Forest, CA (US); Sang Huynh, Yorba Linda, CA (US); Anthony L. Pei, Irvine, CA (US); Kenneth J. D'Souza, Irivne, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 242 days.

(21) Appl. No.: 13/358,392

(22) Filed: Jan. 25, 2012

(51) Int. Cl.
*G06F 11/00* (2006.01)

(52) U.S. Cl.
USPC .......................................... 714/6.32; 714/718

(58) Field of Classification Search
USPC ............... 714/6.32, 718, 48, 36, 6.1, 6.11, 54
See application file for complete search history.

(56) References Cited

U.S. PATENT DOCUMENTS

| | | | |
|---|---|---|---|
| 5,654,841 A * | 8/1997 | Hobson et al. | 360/75 |
| 6,408,406 B1 * | 6/2002 | Parris | 714/41 |
| 6,546,489 B1 * | 4/2003 | Frank et al. | 713/187 |
| 7,203,020 B1 * | 4/2007 | Viglione et al. | 360/75 |
| 7,743,284 B1 * | 6/2010 | Taylor et al. | 714/42 |
| 2006/0168499 A1 * | 7/2006 | Edwards et al. | 714/763 |

* cited by examiner

*Primary Examiner* — Dieu-Minh Le

(57) ABSTRACT

The application discloses systems that can include a monitoring module that is operative to provide an event indicator of an event occurring on a hard-disk drive. The systems can include a recording module that is operative to create an event record based on a logging instruction to log the event indicator. The systems can include an event linkage module that is operative to link the event record to a hard-disk drive activity indicator. The systems can include an error log formatting module that is operative to format the event record and a hard-disk drive activity indicator into a hard-disk drive error log. The systems can include a configuration module to set configuration flags and/or values. The error log can be stored on various areas of the hard-disk drive. The application also discloses related methods.

26 Claims, 5 Drawing Sheets

FIG. 4

HARD-DISK DRIVE WORK LOAD PROFILING AND CAPTURING SYSTEMS AND METHODS

TECHNICAL FIELD

The field relates to systems and methods for hard-disk drive testing. More particularly, the field relates to systems and methods used to profile and capture the work load of hard-disk drives.

BACKGROUND

To ensure reliability, a manufacturer of hard-disk drives subjects a hard-disk drive to rigorous tests, including Quality Assurance (QA) processes. In a conventional QA process, a test client (that typically includes a test application) at a manufacturer's QA facility performs a set of sequential reads and sequential writes on a hard-disk drive under test. The test client can also perform random reads and writes at random locations on the hard-disk drive under test. If a hard-disk drive under test correctly performs the requested reads and writes from the test client, the hard-disk drive under test is allowed to pass QA inspection and is shipped to a customer or to an intermediate entity that re-brands or integrates the hard-disk drive into a larger system.

However, conventional QA processes do not accurately determine whether a hard-disk drive is likely to fail at a customer site. The mere determination of whether a hard-disk drive under test is like to perform sequential and random read and write operations is insufficient to simulate the actual performance of the hard-disk drive in the field. The use of conventional QA processes is therefore likely to lead to defective drives being shipped to customer sites, sometimes with disastrous consequences, particularly in enterprise applications.

BRIEF DESCRIPTION OF THE DRAWINGS

The present invention is illustrated by way of example, and not limitation, in the figures of the accompanying drawings in which:

FIG. 4 shows an example of user work load capture.

DETAILED DESCRIPTION

In the following description, numerous specific details are set forth to provide a thorough understanding of various embodiment of the present invention. It will be apparent however, to one skilled in the art that these specific details need not be employed to practice various embodiments of the present invention. In other instances, well known components or methods have not been described in detail to avoid unnecessarily obscuring various embodiments of the present invention.

Figure 1:
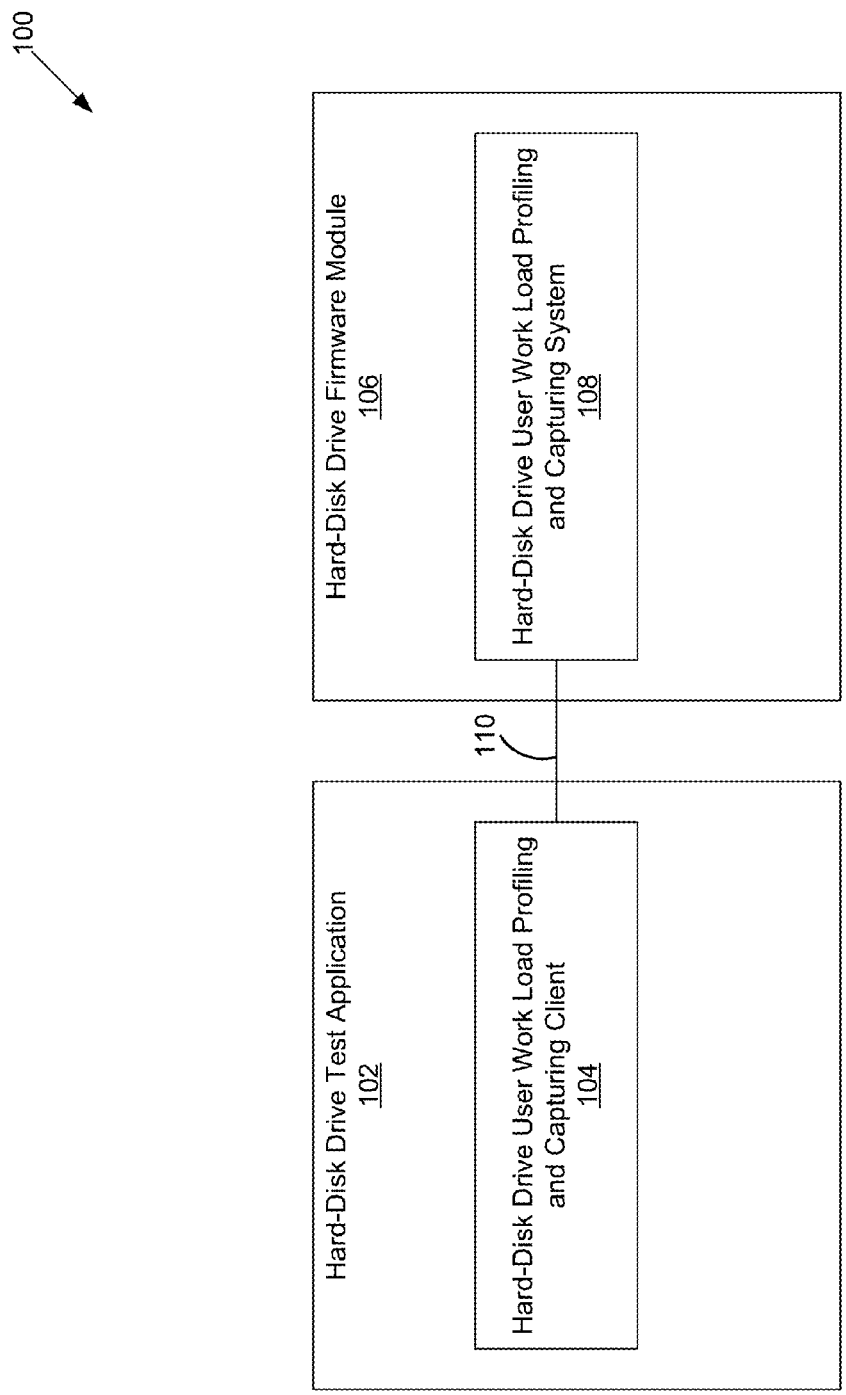
FIG. 1 shows an example of a hard-disk drive test environment.

FIG. 1 shows an example of a test hard-disk drive test environment 100. In the example of FIG. 1, the hard-disk drive test environment 100 comprises a hard-disk drive test application 102, a hard-disk drive user work load profiling and capturing client 104, a hard-disk drive firmware module 106, a hard-disk drive user work load profiling and capturing system 108, and a hard-disk drive user work load interface 110.

In the example of FIG. 1, the hard-disk drive test application 102 comprises an application that a tester can use to verify functionalities of a hard-disk drive under test. The hard-disk drive test application 102 can include user interface elements, such as a graphical user interface (GUI), to facilitate input of specific and/or random test routines and parameters. The hard-disk drive test application 102 can also display test data relating to a specific hard-disk drive under test. For instance, the hard-disk drive test application 102 can be a spreadsheet application that displays test results as a set of columns. The hard-disk drive test application 102 be a test script application that accepts as input a test script and displays how a given hard-disk drive under test performed according to the test script. The hard-drive test application 102 can include executable modules, non-executable modules, and datastores. The hard-disk drive test application 102 can be a standalone application or can be incorporated into a container module, such as an Internet browser-based or cloud-based computing container module. The hard-drive test application 102 can run on a digital device, such as the digital device 500, further discussed in relation to FIG. 5.

In the example of FIG. 1, the hard-disk drive user work load profiling client 104 can accept specific and/or random test routines and parameters from a tester using the hard-disk drive test application 102 and can provide the hard-disk drive user work load profiling client 102 with test data relating to a specific hard-disk drive under test. The hard-disk drive user work load profiling client 104 can also include executable and non-executable modules, datastores, backend modules, and other components to set up the display of hard-disk drive test results on the hard-disk drive test application 102. The test results can be in one or more of a variety of formats, including a spreadsheet format, a format compatible with a test script output, or other format. The hard-disk drive work load profiling client 104 can also have one or more mechanisms to connect and pass data to and from the hard-disk drive user work load interface 110.

In the example of FIG. 1, the hard-disk drive firmware module 106 includes hardware and/or software used to internally control a hard-disk drive under test. The hard-disk drive firmware module 106 can be compatible and/or modifiable by programming languages, including low-level programming languages. The hard-disk drive firmware module 106 can include memory used to store control functionalities. Examples of memory could include read only memory (ROM) and/or programmable logic array (PLA) structures.

In the example of FIG. 1, the hard-disk drive firmware module 106 can control reading and writing to a hard-disk drive under test. In some embodiments, a hard-disk drive under test can comprise a magnetic hard-disk drive. The magnetic hard-disk drive can store bits in small magnetized regions therein, with data being arranged in concentric tracks from the inner diameter of the disk to near the outer diameter of the disk. The hard-disk drive firmware module 106 can specify locations of the hard-disk drive to be written to and can further provide the information to be written to those specified locations. The hard-disk drive firmware module 106 can also read information from the hard-disk drive under test. Further, the hard-disk drive firmware module 106 can encode data, keep the hard-disk drive under test secure, and can manage resources and services related to the hard-disk drive under test. In the example of FIG. 1, the hard-disk drive firmware module 106 can implement hard-disk drive work load profiling and capturing systems and methods (such as the hard-disk drive user work load profiling and capturing system 108).

In the example of FIG. 1, the hard-disk drive firmware module 106 is shown as a single module. However, in some embodiments, the hard-disk drive firmware module 106 could comprise multiple firmware modules that perform complementary or supplementary functions. For instance, the hard-disk drive firmware module 106 can comprise a system firmware module that performs reads, writes, security functions, etc. on a hard-disk drive under test. The hard-disk drive firmware module 160 can also comprise a recorder firmware module that provides hard-disk drive user work load profiling and capturing. Thus though FIG. 1 shows the hard-disk drive user work load profiling and capturing systems integrated into the firmware of a hard-disk drive under test, in some embodiments, the hard-disk drive user work load profiling and capturing systems could be distinct and/or independent from the firmware of a hard-disk drive under test.

Figure 2:
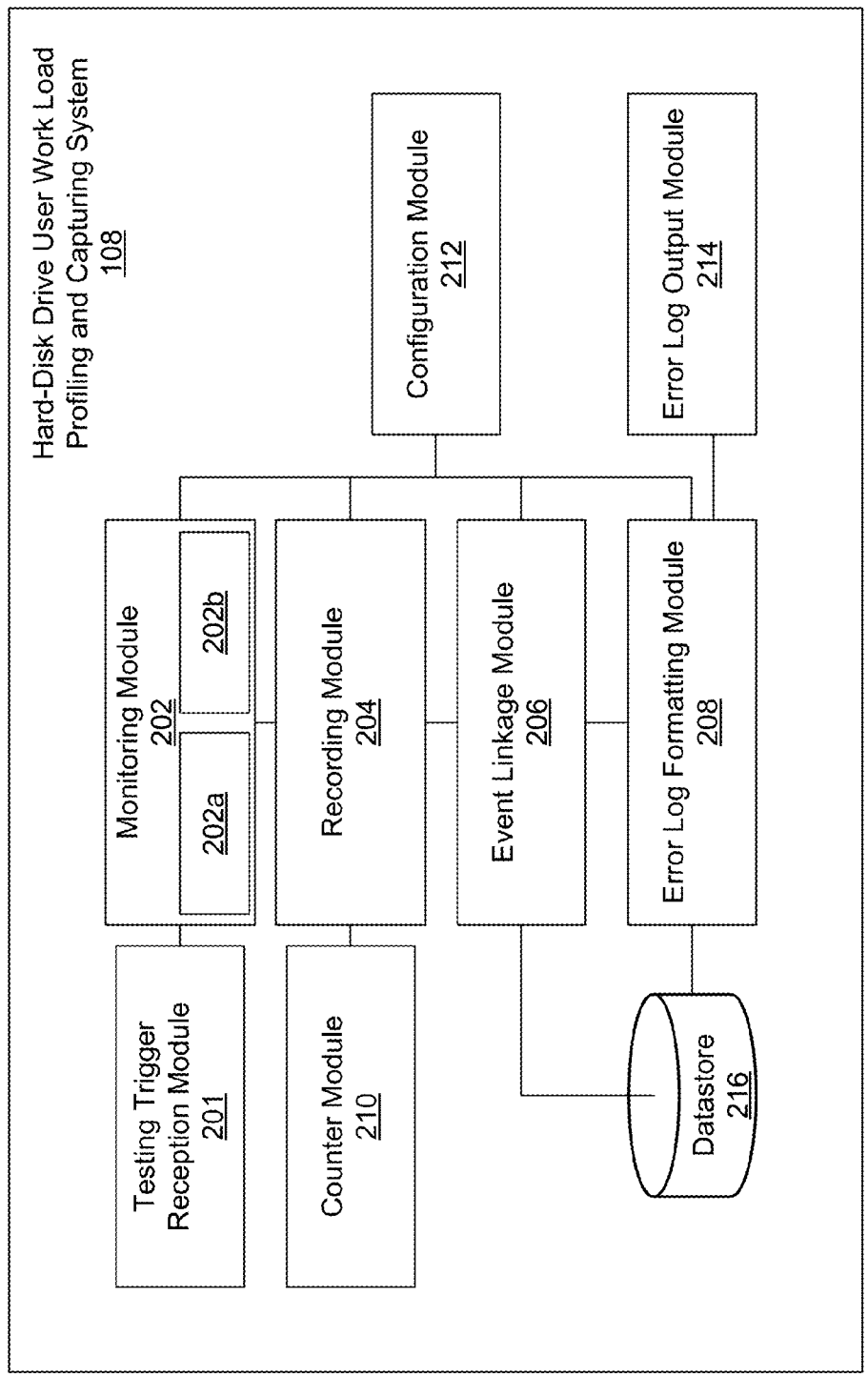
FIG. 2 shows an example of an example of a hard-disk drive user work load profiling and capturing system.

In the example of FIG. 1, the hard-disk drive user work load profiling and capturing system 108 can profile and/or capture events relating to the hard-disk drive under test and can link these captured events to specific hard-disk drive activity. Events relating to a hard-disk drive under test can include events relating to a hard-disk drive's host system (i.e., host-level events) or events relating to the hard-disk drive itself (i.e., disk-level events). Specific hard-disk drive activity could include sets of host inputs as well as operating conditions and events that occur as the hard-disk drive under test is incorporated into the larger system. In some embodiments, the hard-disk drive user work load profiling and capturing system 108 can log captured events into a format compatible with test devices, such as the hard-disk drive work load profiling and capturing client 104. FIG. 2 and the related text further illustrate the structural components and the functionality of an example of a hard-disk drive user work load profiling and capturing system 108.

In the example of FIG. 1, the hard-disk drive user work load profiling and capturing system 108 can include a memory and a processor, or can be linked to memory and a processor of the host system containing the hard-disk drive firmware module 106 such that the hard-disk drive user work load profiling and capturing system 108 need not be purely software. Thus, as disclosed herein, the hard-disk drive user work load profiling and capturing system 108 can include a combination of hardware and software and need not be exclusively software. Some or all of the modules in the hard-disk drive user work load profiling and capturing system 108 can therefore include hardware, software, or a combination thereof and need not be limited exclusively to software.

Moreover, in various embodiments, the hard-disk drive user work load profiling and capturing system 108 can perform one or more physical transformations on the apparatuses of the host system containing the hard-disk drive firmware module 106. The hard-disk drive user work load profiling and capturing system 108

In the example of FIG. 1, the hard-disk drive user work load interface 110 can connect modules inside the hard-disk firmware module 106 to modules inside the hard-disk drive test application 102. In some embodiments, the hard-disk drive user work load interface 110 can provide information relating to specific test procedures and test routines from the hard-disk drive test application 102 to the hard-disk drive firmware module 106. The hard-disk drive user work load interface 110 can also provide specific test data (including the data gathered from the hard-disk drive user work load profiling and capturing system 108) from the hard-disk drive firmware module 106 to the hard-disk drive test application 102. The hard-disk drive user work load interface 110 can be part of a network interface, such as an Ethernet cable, can be incorporated into the functionality of a wireless network interface, or can have its functionality incorporated into an interface such as a peripheral interface. Examples of peripheral interfaces include a Universal Serial Bus (USB) interface and a Personal Computer Memory Card International Association (PCM-CIA) interface. The hard-disk drive user work load interface 110 provides.

FIG. 2 shows an example of a hard-disk drive work load profiling and capturing system 108. In the example of FIG. 2, the hard-disk drive work load profiling and capturing system 108 can profile and/or capture events relating to a hard-disk drive under test and can link these events to specific hard-disk drive activity. The hard-disk drive work load profiling and capturing system 108 can include a testing trigger reception module 201, a monitoring module 202, a recording module 204, an event linkage module 206, an error log formatting module 208, a counter module 210, a configuration module 212, an error log output module 214, and a datastore 216. The testing trigger reception module 201 is coupled to the monitoring module 202. The monitoring module 202 is coupled to the recording module 204 and the configuration module 212. The recording module 204 is coupled to the monitoring module 202, the counter module 210, and the configuration module 212. The event linkage module 206 is coupled to the recording module 204, the error log formatting module 208, and the configuration module 212. The error log formatting module 208 is coupled to the event linkage module 206, the configuration module 212, the error log output module 214, and the datastore 216.

In the example of FIG. 2, the testing trigger reception module 201 is operative to receive a testing trigger and to inform the hard-disk drive work load profiling and capturing system 108 to initiate testing. For example, the testing trigger reception module 201 can be operative to inform the monitoring module 202 to begin providing an event indicator. As discussed in the ensuing paragraphs, the testing trigger can come from the hard-disk drive under test, can be related to events that the hard-disk drive under test experiences, or can come from the test application.

In the example of FIG. 2, the testing trigger of the testing trigger reception module 201 can come from the hard-disk drive under test. The testing trigger reception module 201 can interface with the hard-disk drive under test to receive indicators of events that occur on the hard-disk drive under test. For instance, the testing trigger of the testing trigger reception module 201 can comprise a power-on indicator from the power system of the hard-disk drive under test. The testing trigger can also include a test sequence time indicator to indicate that the hard-disk drive under test has been on (or has performed an operation sequence such as a read operation sequence or a write operation sequence) for a given duration of time. The testing trigger can further include a test location indicator that the hard-disk drive under test is writing to a specified disk drive location. The testing trigger can also include a data block size indicator that the hard-disk drive under test is writing a data block of a given size. In various embodiments, the testing trigger can include a wrap indicator that the hard-disk drive under test is ready to wrap data.

In the example of FIG. 2, the testing trigger of the testing trigger reception module 201 can include hard-disk drive condition indicators of internal or external events that the hard-disk drive under test experiences. The testing trigger reception module 201 can interface with electrical or mechanical modules that indicate shock, vibration, or internal or external temperature values or variations in the hard-disk drive under test.

In the example of FIG. 2, the testing trigger of the testing trigger reception module 201 can come from the test application running tests on the hard-disk drive under test. The testing trigger reception module 201 can interface directly or indirectly with the test application. In various embodiments, the testing trigger of the testing trigger reception module 201 can include a test application initialization indicator that the test application has started-up, awoken from a sleep state, or has begun a sequence of specific tests. The testing trigger can also include a runtime indicator that the test application has run for a given amount of time, or that a specified test has run for a given amount of time. The testing trigger of the testing trigger reception module 201 can also receive user interface indicators and can therefore be tuned into user interface elements in the test application. For instance, the testing trigger can be configured to receive a right-click, a selection of a testing button, or other user interface input.

In some embodiments, the testing trigger of the testing trigger reception module 201 can include an error rate indicator that the test application has found a certain error rate on the hard-disk drive under test. For example, the test application may be running a specified set of tests on the hard-disk drive under test, and may be calculating an error rate based on the specified set of tests. Once the error rate of the tests hit a given number, the testing trigger of the testing trigger reception module 201 can be initiated.

In some embodiments, the testing trigger of the testing trigger reception module 201 can include a test application's estimated performance indicators of internal or external events that the hard-disk drive under test experiences. For instance, the test application, as part of its test sequence, may be estimating the shock, vibration, or internal or external temperature values or variations in the hard-disk drive under test. Once any of these estimates hit a predetermined value, the testing trigger can be initiated.

In the example of FIG. 2, once the testing trigger reception module 201 receives the testing trigger it can inform the other modules in the hard-disk drive work load profiling and capturing system 108 to initiate testing. For instance, the testing trigger reception module 201 can inform the monitoring module 202 to begin being its monitoring processes.

In the example of FIG. 2, the monitoring module 202 includes a host-level monitoring module 202a and a disk-level monitoring module 202b. The monitoring module 202 is operative to provide an event indicator of an event occurring on a hard-disk drive. The event indicator can be a host-level event indicator and/or a disk-level event indicator.

In the example of FIG. 2, the event indicator provided by the monitoring module 202 can be a power on-time indicator. For instance, the event indicator can correspond to a time that a computer system incorporating the hard-disk drive containing the monitoring module 202 is powered on. In some embodiments, the monitoring module 202 can obtain the power-on time either directly or indirectly from the operating system of the computer system incorporating the hard-disk drive containing the monitoring module 202.

In the example of FIG. 2, the event indicator provided by the monitoring module 202 can comprise a Small Computer System Interface (SCSI) indicator such as a command type indicator or an operation code type indicator of information provided to the hard-disk drive containing the monitoring module 202. For instance, the event indicator can correspond to command descriptor blocks (CDBs), operation codes, or command-specific parameters that a computer system passes to the hard-disk drive. The event indicator can also provide a character string or a number corresponding to a status code from the hard-disk drive.

In the example of FIG. 2, the event indicator provided by the monitoring module 202 can be a block size indicator. For instance, the event indicator can correspond to the size of a sector and/or block on the hard-disk drive. The sector and/or block can correlate to read operations, write operations, or other operations or functions occurring on the hard-disk drive.

In the example of FIG. 2, the event indicator provided by the monitoring module 202 can be a beginning logical block address (LBA) indicator. For example, the event indicator can correspond to a beginning LBA at which specific read operations, write operations, or other operations or functions occur on a hard-disk drive containing the monitoring module 202. A LBA is an addressing scheme used to specify a location on a storage device, such as the hard-disk drive under test. Each element of the LBA addressing scheme describes a logical block on the storage device. In some embodiments, the event indicator could also correspond to an ending LBA In the example of FIG. 2, the event indicator provided by the monitoring module 202 can be a hard-disk drive temperature indicator. For example, the event indicator can correspond to an actual or estimated temperature of a hard-disk drive containing the monitoring module 202. In some embodiments, the monitoring module 202 can obtain the actual temperature of the hard-disk drive directly or indirectly with a temperature sensor (such as an FTEMP sensor). In some embodiments, the monitoring module 202 can estimate the temperature of the hard-disk drive based on ambient temperature readings or predicted temperature ranges for a given operating range.

In the example of FIG. 2, the event indicator provided by the monitoring module 202 can be an error status indicator. The events indicator provided by the monitoring module 202 can also be a write aborts indicator.

In the example of FIG. 2, the event indicator provided by the monitoring module 202 can be a hard-disk drive shock indicator or a hard-disk vibration indicator. For example, the monitoring module 202 can interface with mechanical modules inside the hard-disk drive under test that provide indicia of shock or vibration.

In the example of FIG. 2, the event indicator provided by the monitoring module 202 can be an indicator of background activities occurring on the hard-disk drive under test. In some examples the indicator of background activities can be a data lifeguard (DLG) indicator. A DLG indicator provides information of the set up and configuration of the hard-disk drive under test. The DLG can include tools to partition the hard-disk drive under test, copy files between partitions, display partition parameters, and display basic technical information relating to the hard-disk drive under test. The DLG can also provide diagnostics to determine the physical condition of the hard-disk drive under test. The DLG can therefore provide information relating to features such as quick hard-disk drive tests, extended hard-disk drive tests, and return merchandise information (RMA). In some embodiments, the indicator of background activities can be a data reliability management (DRM) indicator. A DRM indicator provides information of the integrity of data on the hard-disk drive under test.

In the example of FIG. 2, the event indicator provided by the monitoring module 202 can be a cache flush indicator. A cache flush indicator includes information of clearing a cache and writing the data in the cache to the hard-disk drive under test. The cache flush indicator can include information about the success or failure of a cache flush or other parameters of the cache flush, such as the amount or the nature of the data being written to the hard-disk drive under test.

In the example of FIG. 2, the event indicator provided by the monitoring module 202 can be a power management indicator. The power management indicator can relate to power management of the host system or the hard-disk drive under test. For instance, the power management indicator can include information about the power consumed by a host system or a hard-disk drive under test, the efficiency of the host system or the hard-disk drive under test, or battery parameters of the host system or the hard-disk drive under test.

In the example of FIG. 2, the event indicator provided by the monitoring module 202 can be a power transitions indicator. A power transitions indicator includes information about power states or the transition between power states. Examples of power states include an OFF state, an ON state, a sleep state, and a hibernate state. Transitioning between these states can provide information to the monitoring module 202. In the example of FIG. 2, the event indicator provided by the monitoring module 202 can be a reset events indicator. Further, in the example of FIG. 2, the event indicator provided by the monitoring module 202 can be another host-level or disk-level event indicator.

In the example of FIG. 2, the recording module 204 is operative to create an event record based on a logging instruction to log the event indicator. In some embodiments, the recording module 204 can receive information of the event indicator from the monitoring module 202. The recording module 204 can then provide a logging instruction to create an event record based on the event indicator obtained from the monitoring module 202.

In the example of FIG. 2, the event linkage module 206 is operative to link the event record to a hard-disk drive activity indicator. The event linkage module 206 can obtain the event record from the recording module 204. The event linkage module 206 can parse the event record to determine the specific event giving rise to the event record. The event linkage module 206 can also parse a set of hard-disk drive activity indicators stored in the datastore 216. The event linkage module 206 can further associate the specific event with one of the stored set of hard-disk drive activity indicators.

In the example of FIG. 2, the hard-disk drive activity indicators can be a set of conditions, events, or command sequences that can give rise to the specific event that was monitored by the monitoring module 202. In some embodiments, the hard-disk drive activity indicators can include a host command sequence. A host command sequence is a series of commands on the computer system hosting the hard-disk drive under test. In various embodiments, the hard-disk drive activity indicators can include a hard-disk drive environmental condition of the host computer system or the hard-disk drive under test. In some embodiments, the hard-disk drive activity indicator can include a hard-disk drive background condition. In various embodiments, the hard-disk drive activity indicator can include other error events.

In the example of FIG. 2, the error log formatting module 208 is operative to format the event record and the hard-disk drive activity indicator into a hard-disk drive error log. In some embodiments, the error log formatting module 208 can obtain the event record and the hard-disk drive activity indicator from the event linkage module 206. The error log formatting module 208 can also format the event indicator and the hard-disk drive activity indicator into a table or other similar data structure. As a result, the error log formatting module 208 can format any of the event record and the hard-disk drive activity indicator into a hard-disk drive error log.

In the example of FIG. 2, the counter module 210 is operative to increment a counter when the recording module 204 creates the event record. In some embodiments, the counter module 210 can contain a digital counter that can be incremented, decremented, reset, or set to a specified value. When the hard-disk drive user work load profiling and capturing system 108 is initialized, the counter module 210 can reset the counter (i.e., set the counter to a value of "0"). When the recording module 204 creates each event record, the counter module 210 can increment the counter. When the counter reaches a specified value (the value can be specified using the configuration flags from the configuration module 212, for instance), the counter module 210 can reset the counter.

In the example of FIG. 2, the counter of the counter module 210 can take a variety of forms. In some embodiments, the counter can comprise a timer that begins at the time the recording module 204 creates the event record, or at a specified time in the testing process. The counter of the counter module 210 can also include an event counter that is incremented each time an event is detected by monitoring module 202. The counter of the counter module 210 can also include a buffer counter that is related to the size of a buffer implemented in the test process. In some embodiments, counter could include a memory counter that counts the memory consumed by the test process.

In the example of FIG. 2, the configuration module 212 is operative to provide a configuration flag to one or more of the monitoring module 202, the recording module 204, the event linkage module 206, and the error log formatting module 208. The configuration module 212 can receive the configuration flag from a tester or a test script executed on a hard-disk drive test application coupled to the hard-disk drive under test. In some embodiments, the configuration flag from the configuration module 212 can include an enablement flag to enable the monitoring module 202 to provide the event indicator.

In the example of FIG. 2, the configuration flag from the configuration module 212 can include a wrap enablement flag. The wrap enablement flag can instruct the error log formatting module 208 to reset the hard-disk drive error log. In some embodiments, resetting the hard-disk drive error log can include deleting all of the data in the hard-disk drive error log or even deleting the hard-disk drive error log itself from the datastore 216. The wrap enablement flag can also instruct the error log formatting module 208 to overwrite portions of the hard-disk drive error log if the hard-disk drive error log is larger than a specified threshold. For instance, the wrap enablement flag may contain information of a data wrap size for the hard-disk drive error log. After the hard-disk drive error log meets or exceeds the data wrap size, the recording module 204, based on the data wrap size from the configuration module 212, can write new event records and/or hard-disk drive activity into portions of the hard-disk drive error log that were already written to.

In the example of FIG. 2, the configuration flag from the configuration module 212 can include a beginning LBA flag to provide to the recording module 204 a beginning LBA to begin creating the event record. For instance, if a tester wanted to create the event record at specified locations or sectors on the hard-disk drive under test, the tester can specify the LBA to begin recording using the configuration flag from the configuration module 212. Similarly, the configuration flag from the configuration module 212 can also include an ending LBA flag to provide the recording module 204 an ending LBA to end creating the event record. In some embodiments, the configuration flag from the configuration module 212 can include a maximum LBA flag to specify the last available LBA to log the event record. Embodiments therefore allow a tester or a test application to closely customize the locations at which error events are logged.

In the example of FIG. 2, the configuration flag from the configuration module 212 can include a flush threshold flag to flush a specified number of entries from the hard-disk drive memory to the hard-disk drive storage. As discussed, flushing a specified number of entries can involve writing the entries stored in volatile memory, such as a cache in random access memory (RAM), to storage on the hard-disk drive under test. The configuration flag can provide the number of entries to be flushed from the volatile memory. In some embodiments, the flush threshold flag can specify that all the entries be flushed from the cache and written to the storage on the hard-disk drive under test. In various embodiments, the flush threshold flag can be modified based on system performance needs. For instance, a larger flush threshold can hold a larger number of entries in volatile memory, can reduce the number of writes, and can speed up system performance. A smaller flush threshold can cause increase the number of writes to the hard-disk drive and can reduce the number of entries stored in volatile memory.

In the example of FIG. 2, the error log output module 214 is operative to communicate the formatted error log from the error log formatting module 208 to a test application. In some embodiments, the error log output module 214 can transmit the formatted error log to a client. In some embodiments, the error log output module 214 can receive configuration flags as well as instructions from the client to modify parameters of the error log.

In the example of FIG. 2, the datastore 216 is operative to store data related to one or more operations of the hard-disk drive user work load profiling and capturing system 108. In some embodiments, the datastore 216 can store an event indicator, an event record, a hard-disk drive activity indicator, a hard-disk drive error log, and a confirmation flag.

In the example of FIG. 2, the datastore 216 can store the hard-disk drive error log at one or more locations, including a combination of spare and user sectors (i.e., locations) on the hard-disk drive under test. User locations or sectors of the hard-disk drive are the areas of the hard-disk drive that store user data. Spare locations or sectors of the hard-disk drive are areas of the hard-disk drive that do not typically store user data but rather can be used in place of user locations or sectors in the event that specific user locations or sectors are defective. In some embodiments, the hard-disk drive error log can be stored solely on spare locations of the hard-disk drive or solely on user locations of the hard-disk drive.

In various embodiments, the hard-disk drive error log can be stored on a locked user-location of the hard-disk drive. A locked user location is a user location that is not visible to a user or a host computer system that integrates the hard-disk drive under test.

In some embodiments, the hard-disk drive error log can include a first hard-disk drive error log and a second hard-disk drive error log. The first hard-disk drive error log can be stored on a user location or sector of the hard-disk drive under test. The first hard-disk drive error log can have a user-location data wrap parameter that can correspond to the size of a user-location data storage area. The second hard-disk drive error log can be stored on a spare location or sector of the hard-disk drive under test. The second hard-disk drive error log can have a spare-location data wrap parameter that can correspond to the size of a spare-location data storage area. In various embodiments, the spare-location data wrap parameter can be smaller than the user-location data wrap parameter. As a result, the user locations of the hard-disk drive error log can store a larger error log than the spare locations of the hard-disk drive error log. Such a configuration can be especially helpful when user locations of the hard-disk drive cannot be accessed and need to be overwritten after a hard-disk drive crash.

Figure 3:
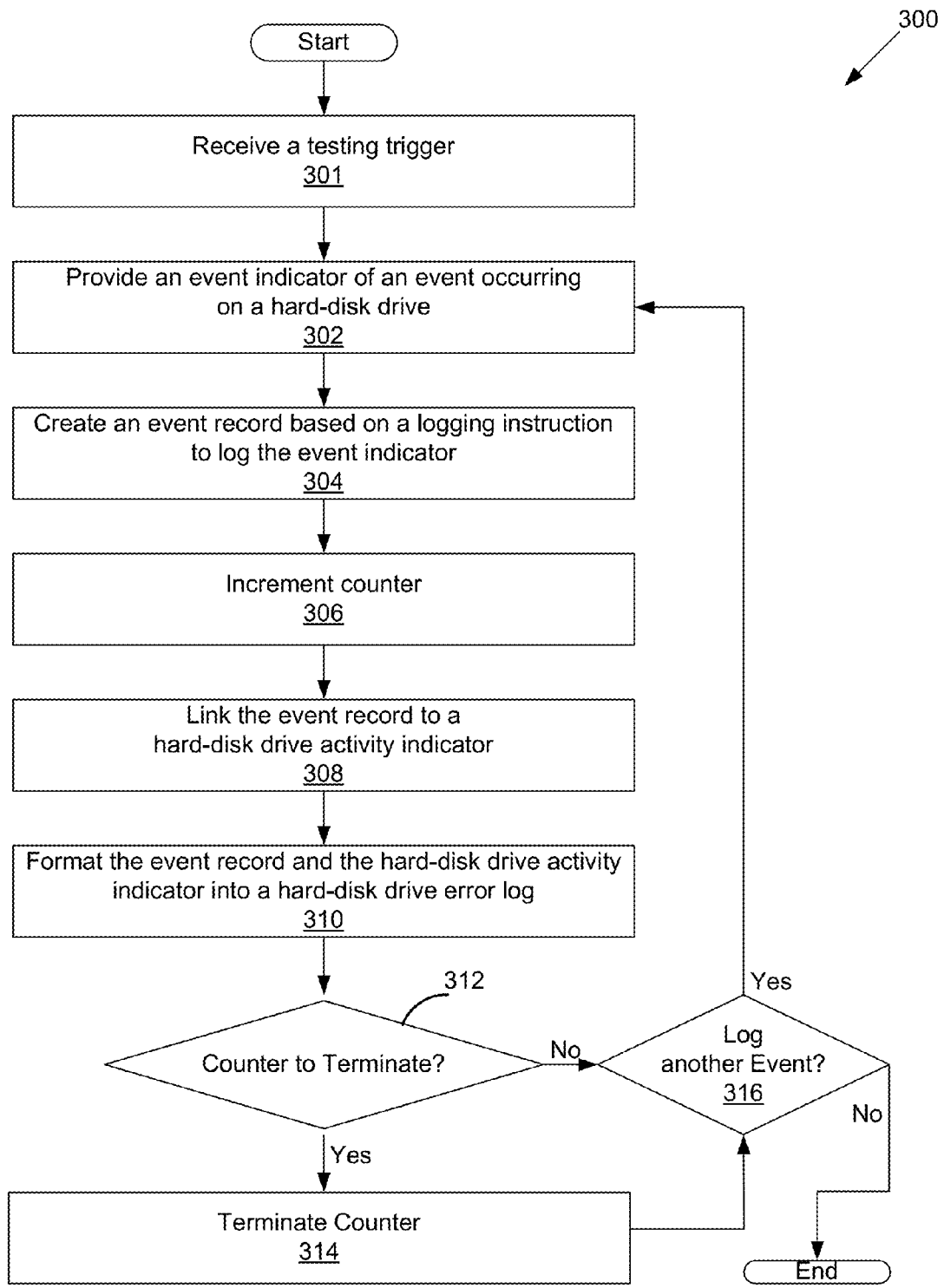
FIG. 3 shows an example of a method for capturing user work load profiling information.

FIG. 3 shows an example of a method 300 for capturing user work load profiling information. The method 300 is discussed in conjunction with the modules illustrated in the hard-disk drive work load profiling and capturing system 108, which were illustrated and discussed in relation to FIG. 2.

In the example of FIG. 3, the method 300 begins at step 301, receiving a testing trigger. Turning to FIG. 2, the testing trigger reception module 201 can receive a testing trigger from the hard-disk drive under test or from the test application. The testing trigger received by the testing trigger reception module 201 can inform the monitoring module 202 to begin the process of evaluating events occurring on the hard-disk drive under test.

In the example of FIG. 3, the method 300 continues to step 302, providing an event indicator of an event occurring on a hard-disk drive. Turning to FIG. 2, the monitoring module 202 can provide an event indicator of an event that occurs on the hard-disk drive containing the hard-disk drive user work load profiling and capturing system 108. The event can be a host-level event, monitored by the host-level monitoring module 202*a*, or a disk-level event, monitored by the disk-level monitoring module 202*b*.

In the example of FIG. 3, the method 300 continues to step 304, creating an event record based on a logging instruction to log the event indicator. Turning to FIG. 2, the recording module 204 can create an event record based on a logging instruction to log the event indicator obtained from the monitoring module 202.

In the example of FIG. 3, the method 300 continues to step 306, incrementing a counter. Turning to FIG. 2, the counter module 210 can increment its counter when the recording module 204 creates the event record. As discussed, the counter can comprise a timer, an event counter, a buffer size counter, a memory consumption counter, or other counter.

In the example of FIG. 3, the method 300 continues to step 308, linking the event record to a hard-disk drive activity indicator. Turning to FIG. 2, the event linkage module 206 can link the event record from the recording module 204 to a hard-disk drive activity indicator.

In the example of FIG. 3, the method 300 continues to step 310, formatting the event record and the hard-disk drive activity indicator into a hard-disk drive error log. Turning to FIG. 2, the error log formatting module 208 can format the event record from the recording module 204 and the hard-disk drive activity indicator from the event linkage module 206 into a hard-disk drive error log. The error log formatting module 208 can also store the hard-disk drive error log in the datastore 216.

In the example of FIG. 3, the method 300 continues to decision point 312, determining whether the counter is to terminate. Turning to FIG. 2, the counter module 210 determines whether the counter stored therein has reached a specified value and if so, can issue an instruction to terminate the counter.

In the example of FIG. 3, if the counter is to terminate, the method 300 continues to step 314, terminating the event counter. Turning to FIG. 2, the counter module 210 can terminate the counter stored within it. After the counter has been terminated, the method 300 continues to decision point 316, determining whether to log another event. In the example of FIG. 3, if the counter has not reached the specified value, the method 300 in any case continues to decision point 316.

In the example of FIG. 3, if another event is to be logged, the method 300 continues to step 302 and continues to execute until the tester no longer wishes to log another event. If another event is not to be logged, the method 300 can end.

Figure 4:
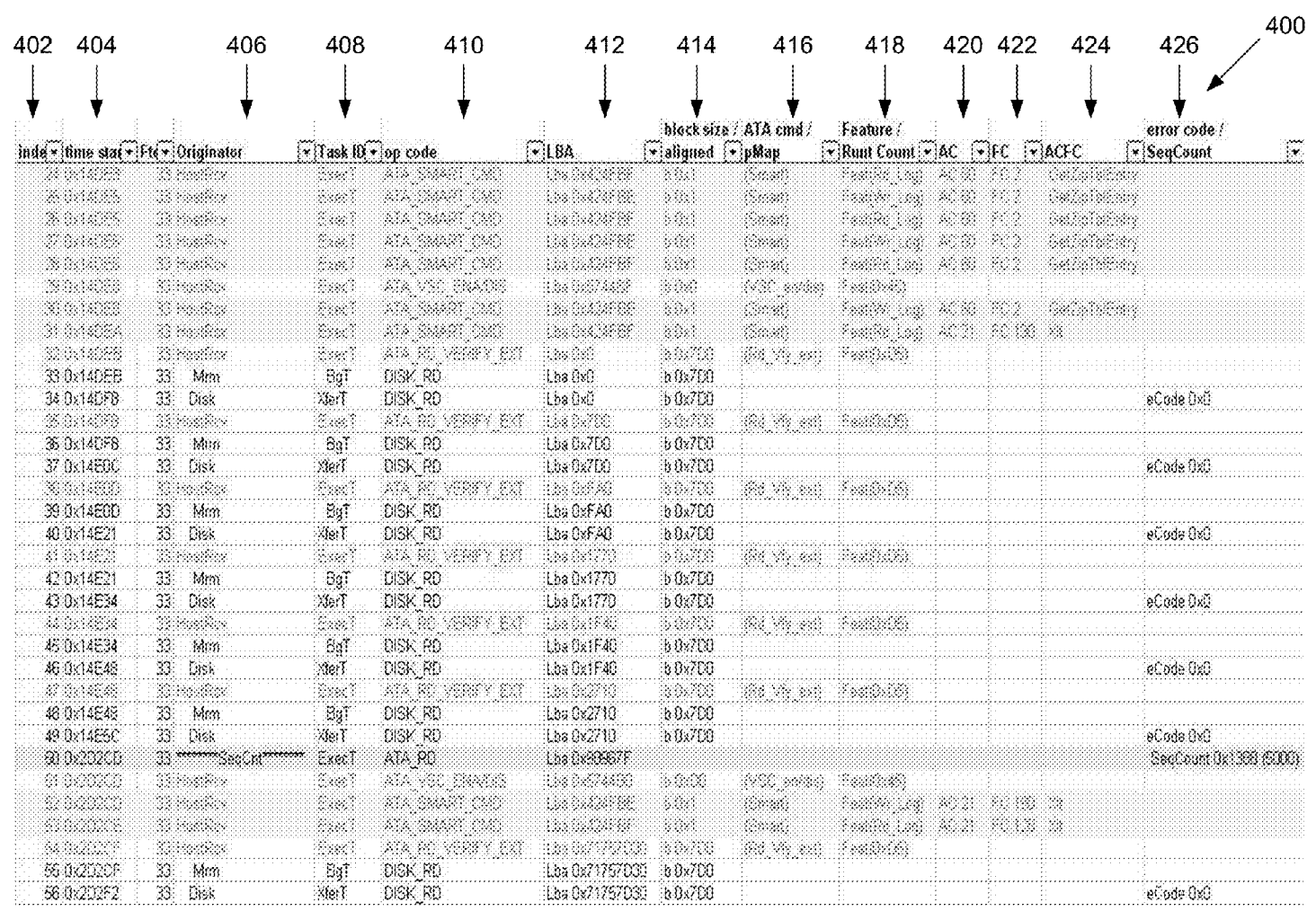

FIG. 4 shows an example of user work load profiling capture 400. In the example of FIG. 4, the user work load profiling capture 400 includes a set of columns that display elements of a hard-disk drive error log. Though the user work load profiling capture 400 shows the hard-disk drive error log in a spreadsheet format (e.g., Microsoft Excel format), the user work load profiling capture can be compatible with other formats, such as a script format to be run on a test application. The following discussion elucidates some of the columns in the user work load profiling capture 400.

In the example of FIG. 4, the user work load profiling capture 400 includes an index column 402 to provide a reference for a given row of entries in the user work load profiling capture 400.

In the example of FIG. 4, the user work load profiling capture 400 includes a start time column 404. The start time column 404 specifies the start time of a given event. The start time can be provided in one of a variety of formats, such as a binary format, a decimal format, or (as shown in FIG. 4), a hexadecimal format.

In the example of FIG. 4, the user work load profiling capture 400 includes an originator column 406. The originator column 406 specifies the portion of the hard-disk drive under test or the host computer system that gives rise to the event being logged. For example, originators of event could include: HostRcv, which corresponds to data from the host computer; Mrm, which corresponds to data from the memory on the hard-disk drive under test, and disk, which corresponds to data from the actual hard-disk drive under test.

In the example of FIG. 4, the user work load profiling capture 400 includes a task identification column 408 to identify the task associated with the event being logged. The user work load profiling capture 400 also includes an operation code column 410. The operation code column 410 can specify the operation being performed in relation to the event being logged. The user work load profiling capture 400 further includes a LBA column 412 to provide the beginning LBA of the event being logged.

In the example of FIG. 4, the user work load profiling capture 400 includes a block size column 412 to provide the block size of the operation giving rise to the event being logged. The user work load profiling capture 400 can include an Advanced Technology Attachment (ATA) command column 414 to provide the ATA command related to the event being logged. The user work load profiling capture 400 can further include a feature/runtime count column 416, an active code column 418, a function code (FC) column 420, and an ACFC column 422.

In the example of FIG. 4, the user work load profiling capture 400 includes an error code/sequential count column 424. The error code/sequential count column 424 can specify an error code returned at a specific time or related to a specific index. As shown, the error code/sequential count column 424 can also include a sequence count (i.e., "SeqCount 0x1388 (5000)") to specify that error code that has repeated a sequential number of times.

Figure 5:
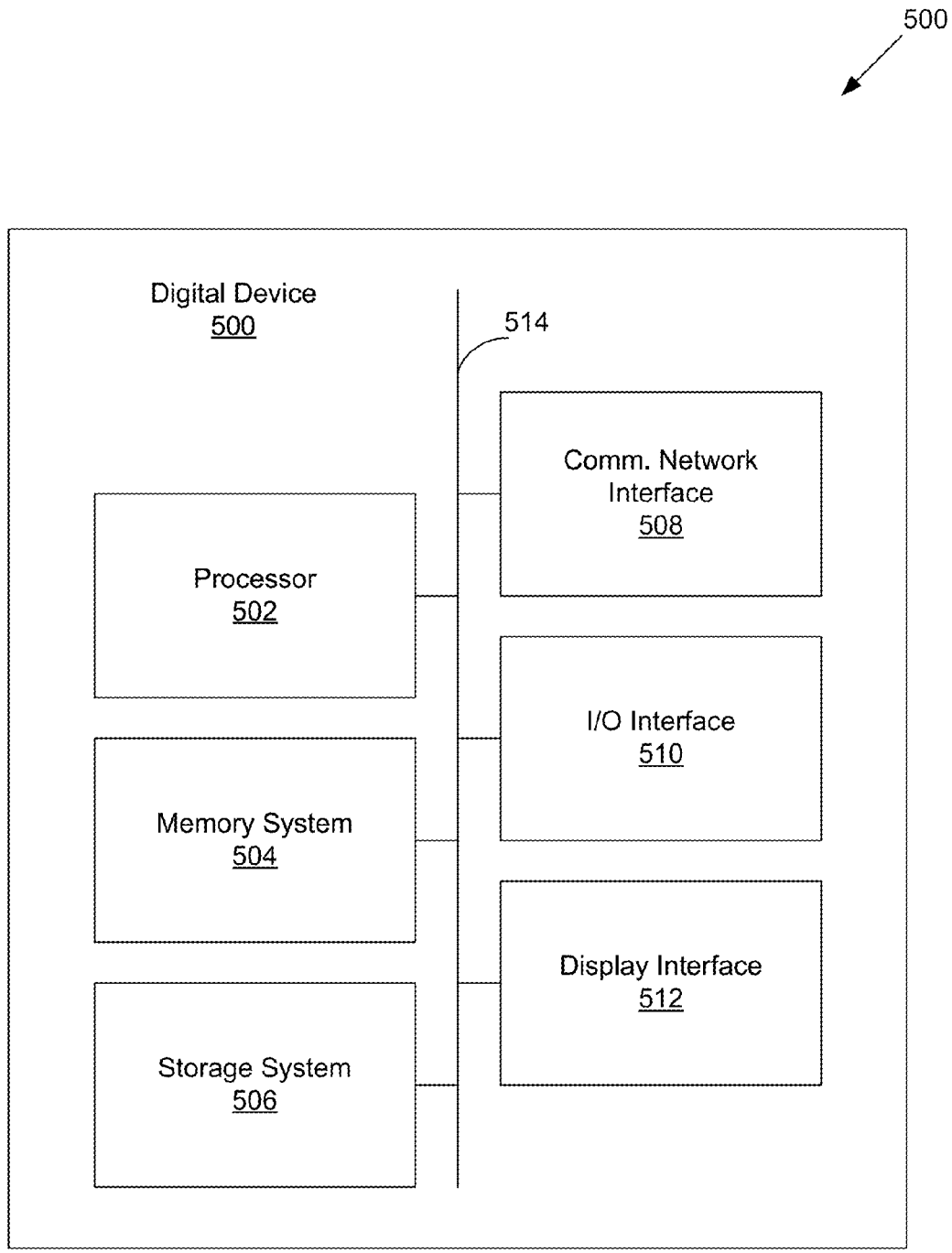
FIG. 5 shows an example of a digital device.

FIG. 5 shows an example of a digital device 500. In the example of FIG. 5, the digital device 500 comprises a processor 502, a memory system 504, a storage system 506, a communication network interface 508, an I/O interface 510, and a display interface 512 communicatively coupled to a bus 514. The processor 502 can be configured to execute executable instructions (e.g., programs). In some embodiments, the processor 502 comprises circuitry or any processor capable of processing the executable instructions.

In the example of FIG. 5, the memory system 504 is any memory configured to store data. Some examples of the memory system 504 are storage devices, such as RAM or ROM. The memory system 504 can comprise the ram cache. In various embodiments, data is stored within the memory system 504. The data within the memory system 504 can be cleared or ultimately transferred to the storage system 506.

In the example of FIG. 5, the storage system 506 is any storage configured to retrieve and store data. Some examples of the storage system 506 are flash drives, hard drives, optical drives, and/or magnetic tape. In some embodiments, the digital device 500 includes a memory system 504 in the form of RAM and a storage system 506 in the form of flash data. Both the memory system 504 and the storage system 506 comprise computer readable media which can store instructions or programs that are executable by a computer processor including the processor 502.

In the example of FIG. 5, the communication network interface (com. network interface) 508 can be coupled to a data network (e.g., data network 504 or 514) via the link 516. The communication network interface 508 can support communication over an Ethernet connection, a serial connection, a parallel connection, or an ATA connection, for example. The communication network interface 508 can also support wireless communication (e.g., 502.11 a/b/g/n, WiMAX). It will be apparent to those skilled in the art that the communication network interface 508 can support many wired and wireless standards.

In the example of FIG. 5, the optional input/output (I/O) interface 510 is any device that receives input from the user and output data. The optional display interface 512 is any device that can be configured to output graphics and data to a display. In one example, the display interface 512 is a graphics adapter.

It will be appreciated by those skilled in the art that the hardware elements of the digital device 500 are not limited to those depicted in FIG. 5. A digital device 500 can comprise more or less hardware elements than those depicted. Further, hardware elements can share functionality and still be within various embodiments described herein. In one example, encoding and/or decoding can be performed by the processor 502 and/or a co-processor located on a GPU.

The above-described functions and components can be comprised of instructions that are stored on a storage medium such as a computer readable medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with some embodiments. Those skilled in the art are familiar with instructions, processor(s), and storage medium.

We claim:

1. A system, comprising:
a memory storing executable instructions for controlling a hard-disk drive; and
a processor configured to execute the executable instructions stored in the memory, wherein the executable instructions include:
a monitoring module operative to cause the processor, upon execution, to provide an event indicator of an event occurring on the hard-disk drive;

a recording module operative to cause the processor, upon execution, to create an event record based on a logging instruction to log the event indicator;

an event linkage module operative to cause the processor, upon execution, to link the event record to a hard-disk drive activity indicator;

an error log formatting module operative to cause the processor, upon execution, to format the event record and the hard-disk drive activity indicator into a hard-disk drive error log; and a configuration module operative to cause the processor, upon execution, to provide a configuration flag to one or more of the monitoring module, the recording module, the event linkage module, and the error log formatting module, wherein the configuration flag comprises one or more of:

an enablement flag to enable the monitoring module to provide the event indicator; and a wrap enablement flag to instruct the error log formatting module to reset the hard-disk drive error log or to overwrite portions of the hard-disk drive error log if the hard-disk drive error log is larger than a specified threshold.

2. The system of claim 1, wherein the executable instructions further include a counter module operative to cause the processor, upon execution, to:

increment a counter when the recording module creates the event record; and reset the counter if the counter reaches a specified value.

3. The system of claim 2, wherein the counter comprises one or more of a timer, an event counter, a buffer counter, and a memory counter.

4. The system of claim 1, wherein the configuration flag comprises a logical block address (LBA) flag to provide to the recording module one or more of:

a beginning LBA to begin creating the event record; and an end LBA to end creating the event record.

5. The system of claim 1, wherein the configuration flag comprises a flush threshold flag to flush a specified number of entries from a memory of the hard-disk drive to a storage of the hard-disk drive.

6. The system of claim 1, wherein the hard-disk drive error log is stored on one or more of a user location of the hard-disk drive and a spare location of the hard-disk drive.

7. The system of claim 1, wherein the hard-disk drive error log is stored on a locked user location of the hard-disk drive.

8. The system of claim 1, wherein the hard-disk drive error log comprises:

a first hard-disk drive error log stored on a user location of the hard-disk drive, the first hard-disk drive error log having a user-location data wrap parameter corresponding to a user-location data storage area; and a second hard-disk drive error log stored on a spare location of the hard-disk drive, the second hard-disk drive error log having a spare-location data wrap parameter corresponding to a spare-location data storage area smaller than the user-location data storage area.

9. The system of claim 1, wherein the event indicator comprises one or more of: a power on-time indicator, a command type indicator, an operating type indicator, a block size indicator, a beginning logical block address (LBA) indicator, a hard-disk drive temperature indicator, an error status indicator, a write aborts indicator, a hard-disk drive shock indicator, a hard-disk drive vibration indicator, a data lifeguard (DLG) indicator, a data reliability management (DRM) indicator, a cache flush indicator, a power management indicator, a power transitions indicator, and a reset events indicator.

10. The system of claim 1, wherein the hard-disk drive activity indicator comprises one or more of: a host command sequence, a hard-disk drive environmental condition, a hard-disk drive background condition, and a hard-disk drive error event.

11. The system of claim 1, wherein the event indicator comprises one or more of a host-level event indicator and a disk-level event indicator.

12. The system of claim 1, wherein the executable instructions further-include a testing trigger reception module coupled to the monitoring module, the testing trigger reception module operative to cause the processor, upon execution, to receive a testing trigger and to inform the monitoring module to initiate providing the event indicator.

13. The system of claim 12, wherein the testing trigger comprises one or more of: a power-on indicator, a test sequence time indicator, a test location indicator, a data block size indicator, a wrap indicator, a hard-disk drive condition indicator, a test application initialization indicator, a runtime indicator, a user interface indicator, an error rate indicator, and a test application's estimated performance indicator.

14. A method, comprising:

providing an event indicator of an event occurring on a hard-disk drive;

creating an event record based on a logging instruction to log the event indicator;

linking the event record to a hard-disk drive activity indicator;

formatting the event record and the hard-disk drive activity indicator into a hard-disk drive error log; and providing a configuration flag, wherein the configuration flag comprises one or more of:

an enablement flag to enable providing of the event indicator; and a wrap enablement flag to reset the hard-disk drive error log or to overwrite portions of the hard-disk drive error log if the hard-disk drive error log is larger than a specified threshold.

15. The method of claim 14, further comprising receiving a testing trigger from one or more of the hard-disk drive and a testing application.

16. The method of claim 15, wherein the testing trigger comprises one or more of: a power-on indicator, a test sequence time indicator, a test location indicator, a data block size indicator, a wrap indicator, a hard-disk drive condition indicator, a test application initialization indicator, a runtime indicator, a user interface indicator, an error rate indicator, and a test application's estimated performance indicator.

17. The method of claim 14, further comprising:

incrementing a counter after creating the event record; and terminating the counter if the counter reaches a specified value.

18. The method of claim 17, wherein the counter comprises one or more of a timer, an event counter, a buffer counter, and a memory counter.

19. The method of claim 14, wherein the hard-disk drive error log comprises:

a first hard-disk drive error log stored on a user location of the hard-disk drive, the first hard-disk drive error log having a user-location data wrap parameter; and a second hard-disk drive error log stored on a spare location of the hard-disk drive, the second hard-disk drive error log having a spare-location data wrap parameter lesser than the user-location data wrap parameter.

20. The method of claim 14, wherein the configuration flag comprises a logical block address (LBA) flag to provide one or more of:

a beginning LBA to begin creating the event record; and an end LBA to end creating the event record.

21. The method of claim 14, wherein the configuration flag further comprises a flush threshold flag to flush a specified number of entries from a memory of the hard-disk drive to a storage of the hard-disk drive.

22. The method of claim 14, wherein the hard-disk drive error log is stored on one or more of a user location of the hard-disk drive and a spare location of the hard-disk drive.

23. The method of claim 14, wherein the hard-disk drive error log is stored on a locked user location of the hard-disk drive.

24. The method of claim 14, wherein the event indicator comprises one or more of: a power on-time indicator, a command type indicator, an operating type indicator, a block size indicator, a beginning logical block address (LBA) indicator, a hard-disk drive temperature indicator, an error status indicator, a write aborts indicator, a hard-disk drive shock indicator, a hard-disk drive vibration indicator, a data lifeguard (DLG) indicator, a data reliability management (DRM) indicator, a cache flush indicator, a power management indicator, a power transitions indicator, and a reset events indicator.

25. The method of claim 14, wherein the hard-disk drive activity indicator comprises one or more of: a host command sequence, a hard-disk drive environmental condition, a hard-disk drive background condition, and a hard-disk drive error event.

26. The method of claim 14, wherein the event indicator comprises one or more of a host-level event indicator and a disk-level event indicator.

* * * * *